United States Patent [19]

Kobayashi et al.

[11] 3,945,979

[45] Mar. 23, 1976

[54] POLYCARBONATE RESIN COMPOSITIONS WITH IMPROVED TRANSPARENCY

[75] Inventors: Haruo Kobayashi; Takenori Asajima, both of Chiba; Yoshihiro Narita, Tokuyama, all of Japan

[73] Assignee: Idemitsu Kosan Company Limited, Tokyo, Japan

[22] Filed: Dec. 5, 1974

[21] Appl. No.: 529,929

[30] Foreign Application Priority Data

Dec. 24, 1973 Japan.............................. 48-143648

[52] U.S. Cl..................................... 260/37 PC; 8/4
[51] Int. Cl.².......................................... C08L 69/00
[58] Field of Search................................ 260/37 PC

[56] References Cited
UNITED STATES PATENTS

| | | | |
|---|---|---|---|
| 3,152,098 | 10/1964 | Snedeker | 260/37 PC |
| 3,673,146 | 6/1972 | Factor | 260/37 PC |
| 3,679,629 | 7/1972 | Chalk et al. | 260/37 PC |

*Primary Examiner*—Lewis T. Jacobs
*Attorney, Agent, or Firm*—Flynn & Frishauf

[57] ABSTRACT

Compositions comprising a polycarbonate resin and a mixture of anthraquinone series colorants have excellent transparency.

4 Claims, No Drawings

POLYCARBONATE RESIN COMPOSITIONS WITH IMPROVED TRANSPARENCY

BACKGROUND OF THE INVENTION a. Field of the Invention

The present invention relates to polycarbonate resin compositions comprising a polycarbonate resin, and at least two colorants with thermal resistance and satisfactory blueing effect.

b. Description of the Prior Art

At present, polycarbonates are manufactured by reacting phosgene and a dihydroxy compound, or by an ester exchange method using a diphenylcarbonate and a dihydroxy compound. As the dihydroxy compound in these reactions, an aromatic dihydroxy compound is commonly used.

A colorless transparent polycarbonate using such an aromatic dihydroxy compound as a raw material is tinged with yellow. Therefore, when said polycarbonate is applied to a use requiring transparency, such as the treatment called blueing, the method of coloring with an extremely thin blue-purple color, has been accomplished.

Heretofore, an organic dye of a single color has been used conventionally as a colorant in this treatment. But it cannot resist molding temperatures used with polycarbonate resins (i.e., 260°–320°C.), and its color fades at the time of molding. Such being the case, this colorant could not attain the desired purpose in most cases.

It is an object of the present invention to obtain a polycarbonate resin having remarkably improved transparency by means of adding colorants to a polycarbonate resin.

SUMMARY OF THE INVENTION

In accordance with the present invention, there are provided polycarbonate resin compositions comprising a polycarbonate resin and mixed colorants. As the colorants, one is 1,8-bis-p-methylphenylamino anthraquinone ($\lambda$ max = 585 m$\mu$, 630 m$\mu$) and another is 2,3-bis-N-methyl-N-p-methylphenylamino-6,7-dimethyl anthraquinone ($\lambda$ max = 556 m$\mu$) or 2,3-bis-N-methyl-N-propylphenylamino-6,7-dimethyl anthraquinone ($\lambda$ max = 556 m$\mu$). Mixtures containing all three dyes can also be used.

Each of the colorants is sufficiently resistant to heat and its color does not fade even at the molding temperature for a polycarbonate resin. And mixtures of said colorants give a satisfactory blueing effect. In addition, such effect can be obtained by adding a small amount of the mixed colorant to a polycarbonate resin.

DESCRIPTION OF THE PREFERRED EMBODIMENTS

The present invention relates to polycarbonate resin compositions comprising a polycarbonate resin, 1,8-bis-p-methylphenylamino anthraquinone and 2,3-bis-N-methyl-N-p-methylphenylamino-6,7-dimethyl anthraquinone or 2,3-bis-N-methyl-N-propylphenylamino-6,7-dimethyl anthraquinone.

Mixing of the polycarbonate and colorants is accomplished according to conventional methods such as dry color method, liquid color method, master batch method and the like.

1,8-bis-p-methylphenylamino anthraquinone has $\lambda$ max at 585 m$\mu$ and 630 m$\mu$, and has a red-purple color. 2,3-bis-N-methyl-N-p-methylphenylamino-6,7-dimethyl anthraquinone and 2,3-bis-N-methyl-N-propylphenylamino-6,7-dimethyl anthraquinone have $\lambda$ max at 556 m$\mu$ and have a blue color.

The above colorants are preferably mixed in a weight ratio of the former ("1,8" compound) : the latter ("2,3" compound) of 1.5–1:1, which provides a $\lambda$ max of the resulting mixture of about 578 m$\mu$. Thus, the expected blueing effect can be obtained satisfactorily.

Polycarbonate products obtained from compositions in which a colorant mixture is added in a weight ratio of the former to the latter of more than 6/4, for example 1.7, is stained red-purple. And the product is stained blue when it is obtained from compositions in which the colorant mixture is added in a weight ratio of the former to the latter of less than 1.

The colorants used in the present invention are sufficiently stable at temperatures employed for molding polycarbonate resins.

The heat-resisting ability of said colorants is compared with that of a conventional colorant, and the results are shown in Table I.

Table I

| Colorant | Temperature I* | Temperature II** |
|---|---|---|
| 1,8-bis-p-methyl-phenylamino anthraquinone | 155°C. | >352°C. |
| 2,3-bis-N-methyl-N-p-methylphenylamino-6,7-dimethyl anthraquinone | 221°C. | 342°C. |
| 2,3-bis-N-methyl-N-propylphenylamino-6,7-dimethyl anthraquinone | 215°C. | 340°C. |
| 1-p-methylphenylamino-4-hydroxy anthraquinone | 197°C. | 297°C. |

*Temperature I: Temperature at which the weight of the colorant begins to decrease.
**Temperature II: Temperature at which the weight of the colorant decreases by 5 percent.

According to the present invention, polycarbonate resin moldings with improved transparency (i.e., improved Yellowness Index) can be obtained by adding thereto a small amount of the above mixed colorant, preferably in the range of 0.5 to 2.0 parts per million (ppm) to the polycarbonate resin.

The present invention is further illustrated by the following example.

EXAMPLE 1

To a polycarbonate resin powder obtained by condensation polymerization of bisphenol A and phosgene (viscometric average molecular weight Mv = 31,700), the predetermined amount of the mixed dye of the present invention was added. The mixture was pelletized with a screw extruding machine and the thus obtained pellet was formed to a plate of 3 × 3 × ⅛ inches by injection molding.

For the purposes of comparison, a sample containing a conventional dye of single color as a colorant and another sample containing no colorant were used.

A yellowness index determination was made for each plate according to the method of ASTM D1925-63T. Results are shown in Tables 2 and 3.

A plate obtained by the method of this invention was not stained with yellow or blue color.

Mixed dye A is a mixture of 1,8-bis-p-methylphenylamino anthraquinone (American Aniline, commercial name: Amaplast Violet PT) and 2,3-bis-N-methyl-N-p-methylphenylamino-6,7-dimethyl anthraquinone (Sumitomo Chemical Co., Ltd., commercial name: Sumiplast Blue H2R) in a weight ratio of 5:5, and mixed dye B is a mixture of 1,8-bis-p-methylphenylamino anthraquinone (American Aniline, commercial name: Amaplast Violet PT) and 2,3-bis-N-methyl-N-propylphenylamino-6,7-dimethyl anthraquinone (Bayer, chemical name: Macrolex Blue 2R) in a weight ratio of 5:5.

Single dye C is a blue-purple anthraquinone series dye (1-p-methylphenylamino-4-hydroxy anthraquinone) and single dye D is a blue-purple anthraquinone series dye (1-p-methylphenylamino-4-hydroxy anthraquinone).

Table 2

| Sample | Added amount (ppm) | Extrusion temperature (°C.) | Injection molding temperature (°C.) | Yellowness index of sample |
|---|---|---|---|---|
| Mixed dye A | 1 | 320 | 320 | 3.8 |
| Mixed dye B | 1 | 320 | 320 | 3.9 |
| Single dye C | 1 | 320 | 320 | 5.1 |
| Single dye D | 1 | 320 | 320 | 5.5 |
| Non-colored | — | 320 | 320 | 6.0 |
| Mixed dye A | 1 | 280 | 320 | 3.9 |
| Mixed dye B | 1 | 280 | 320 | 4.0 |
| Non-colored | — | 280 | 320 | 6.0 |

Table 3

| Sample | Added amount (ppm) | Extrusion temperature (°C.) | Injection molding temperature (°C.) | Yellowness index of sample |
|---|---|---|---|---|
| Mixed dye A | 2 | 320 | 320 | 2.4 |
| Mixed dye B | 2 | 320 | 320 | 2.6 |
| Single dye C | 2 | 320 | 320 | 4.9 |
| Single dye D | 2 | 320 | 320 | 5.2 |
| Non-colored | — | 320 | 320 | 6.0 |

Polycarbonate resin compositions of the present invention can be readily applied to the manufacturing of various kinds of molding or construction materials, for example plastic, glass, bottle, case, etc. requiring excellent transparency.

Further, the compositions of the present invention are widely usable as daily necessaries (eye dropper bottle, nursing bottle, cosmetic bottle, etc.), electric and electronic parts (switch, switch cover, etc.), machine parts (fan, hose joint, etc.), construction materials (instrument housing, helmet, camera body, etc.) and film sheets (film for wrapping food, floor tile, etc.).

Preparation method of polycarbonate which is used in the Example

An aqueous solution of 1.65N NaOH (15 liters) was placed in a 30 liter glass-lined stirring vessel with a cooling jacket and a thermometer, and 2,630 g of bis-phenol A was dissolved in the solution. To this solution, 7 liters of methylene chloride were added and then phosgene was introduced with the flow rate of 1.1 kg per hour while stirring. During the proceeding reaction, the vessel was cooled by flowing water through the jacket in order that reaction temperature would not exceed 30°C. After 90 minuted pH of the reaction mixture became 11.0 and at this stage, introduction of phosgene and stirring were terminated and subsequently, the reaction mixture was separated into two phases by standing. Polycarbonate oligomer in methylene chloride was obtained by removing aqueous upper phase. Then the oligomer solution was diluted with 9 liters of methylene chloride, and subsequently stirring was re-initiated after adding 15 g of p-t-butylphenol, 4.5 liters of 1.7N NaOH containing bis-phenol A (785 g) and trimethylbenzyl ammonium chloride (1.5 g) and 400ml of aqueous 48% NaOH in this order. The reaction temperature was kept at 30°C by flowing cooling water through the jacket. After 90 minutes, the reaction mixture became a viscous emulsion. The emulsion was diluted with methylene chloride to make polymer concentration of 6% and then it was thoroughly washed with water to remove inorganic salts. Powder polycarbonate (3.5 kg) was obtained by precipitating the polymer in methanol and collecting it with centrifugation and subsequently by drying.

What is claimed is:

1. Polycarbonate resin composition which comprises a polycarbonate resin and a colorant mixture in an amount sufficient to improve the transparency of said polycarbonate resin, said colorant mixture comprising 1,8-bis-p-methylphenylamino anthraquinone and 2,3-bis-N-methyl-N-p-methylphenylamino-6,7-dimethyl anthraquinone or 2,3-bis-N-methyl-N-propylphenylamino-6,7-dimethyl anthraquinon, wherein the weight ratio of 1,8-bis-p-methylphenylamino anthraquinone to 2,3-bis-N-methyl-N-p-methylphenylamino-6,7-dimethyl anthraquinone or 2,3-bis-N-methyl-N-propylphenylamino-6,7-dimethyl anthraquinone is from about 1.5:1 to about 1:1.

2. The composition of claim 1, containing from about 0.5 to about 2.0 parts per million of said anthraquinones.

3. The composition of claim 1, containing a mixture of 1,8-bis-p-methylphenylamino anthraquinone and 2,3-bis-N-methyl-N-p-methylphenylamino-6,7-dimethyl anthraquionone.

4. The composition of claim 1, containing a mixture of 1,8-bis-p-methylphenylamino anthraquinone and 2,3-bis-N-methyl-N-propylphenylamino-6,7-dimethyl anthraquinone.

* * * * *